(12) United States Patent
Lee et al.

(10) Patent No.: US 6,755,956 B2
(45) Date of Patent: Jun. 29, 2004

(54) CATALYST-INDUCED GROWTH OF CARBON NANOTUBES ON TIPS OF CANTILEVERS AND NANOWIRES

(75) Inventors: James Weifu Lee, Oak Ridge, TN (US); Douglas H. Lowndes, Knoxville, TN (US); Vladimir I. Merkulov, Knoxville, TN (US); Gyula Eres, Knoxville, TN (US); Yayi Wei, Fishkill, NY (US); Elias Greenbaum, Oak Ridge, TN (US); Ida Lee, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 408 days.

(21) Appl. No.: 09/873,928

(22) Filed: Jun. 4, 2001

(65) Prior Publication Data

US 2002/0046953 A1 Apr. 25, 2002

Related U.S. Application Data

(63) Continuation-in-part of application No. 09/694,978, filed on Oct. 24, 2000, now Pat. No. 6,447,663.

(51) Int. Cl.$^7$ .................... C25D 5/18; C01B 31/02; C23C 16/26
(52) U.S. Cl. .............. 205/104; 205/118; 205/122; 205/194; 427/249.1; 427/577; 423/447.3
(58) Field of Search .................. 205/104, 118, 205/122, 194; 427/249.1, 569, 577; 423/445 R, 447.3

(56) References Cited

U.S. PATENT DOCUMENTS

2002/0180306 A1 * 12/2002 Hunt et al. ............. 310/302

FOREIGN PATENT DOCUMENTS

EP   1 129 990 A1   9/2001

OTHER PUBLICATIONS

Merkulov, V. I., D. H. Lowndes, Y. Y. Wei, G. Eres, and E. Voelkl (2000) "Patterned growth of individual and multiple vertically–aligned carbon nanotubes," *Appl. Phys. Lett.* 76, 3555.

Dai, H., J. H. Hafner, A. G. Rinzler, D. T. Colbert, and R. E. Smalley, *Nature* 384, 147 (1996).

Nishijima, H., S. Kamo, Seiji Akita, Y. Nakayama, K. I. Hohmura, S. H. Yoshimura, and K. Takeyasu, (1999) *Appl. Phys. Lett.* 74, 4061.

Hafner, J. H., C. Li Cheung, and C. M. Lieber (1999) *Nature* 398, 761.

(List continued on next page.)

*Primary Examiner*—Roy King
*Assistant Examiner*—William T. Leader
(74) *Attorney, Agent, or Firm*—Joseph A. Marasco

(57) ABSTRACT

A method is described for catalyst-induced growth of carbon nanotubes, nanofibers, and other nanostructures on the tips of nanowires, cantilevers, conductive micro/nanometer structures, wafers and the like. The method can be used for production of carbon nanotube-anchored cantilevers that can significantly improve the performance of scaning probe microscopy (AFM, EFM etc). The invention can also be used in many other processes of micro and/or nanofabrication with carbon nanotubes/fibers. Key elements of this invention include: (1) Proper selection of a metal catalyst and programmable pulsed electrolytic deposition of the desired specific catalyst precisely at the tip of a substrate, (2) Catalyst-induced growth of carbon nanotubes/fibers at the catalyst-deposited tips, (3) Control of carbon nanotube/fiber growth pattern by manipulation of tip shape and growth conditions, and (4) Automation for mass production.

8 Claims, 10 Drawing Sheets

OTHER PUBLICATIONS

Ren, Z. F., Z. P. Huang, J. W. Xu, J. H. Wang, P. Bush, M. P. Siegal, and P. N. Provencio (1998) *Science* 282, 1105.

Baker, R. T. K. (1989) *Carbon* 27, 315.

Chen, Y., D. T. Shaw, and L. Guo (2000) *Appl. Phys. Lett.* 76, 2469.

Ren, Z. F. et al, "Growth of a Single Freestanding Multiwall Carbon Nanotube on each Nanonickel Dot," Applied Physics Letters, vol. 75 ( No. 8), pp. 1086–88, ( Aug. 12, 1999).

F.G.Tarntair et al, "High Current Density Field Emission from Arrays of Carbon Nanotubes & Diamond–Clad Si Tips," J. Vac.Sci.Technol.B, vol. 18 ( No.3).

Chris Bower et al, "Nucleation & Growth of Carbon Nanotubes by Microwave Plasma Chemical Vapor Deposition," Applied Physics Ltrs., vol. 77 ( No. 17). ( Oct. 23, 2000).

Z. F. Ren et al, "Large Arrays of Well–Aligned Carbon Nanotubes,".

Suk Jae Chung et al, "Novel Plasma Chemical Vapor Deposition Method of Carbon Nanotubes at Low Temperature for Field Emission Display Application," Diamond & Related Materials 10 (2001), pp. 248–253.

H. Cui et al, "Aligned Carbon Nanotubes via Microwave Plasma Enhanced Chemical Vapor Deposition," Mat.Res. Soc.Symp.Proc.

Y,C.Choi et al, "Controlling the Diameter, Growth Rate and Density of Vertically Aligned Carbon Nanotubes Synthesized by Microwave Plasma–Enhanced Chemical Vapor Deposition," Appl. Physics Ltrs., vol. 76 ( No. 17), pp. 2367–69, ( Apr. 24, 2000).

H. Cui et al, "Deposition of Aligned Bamboo–Like Carbon Nanotubes via Microwave Plasma Enhanced Chemical Vapor Deposition," Jl. of Applied Physics, vol. 88 ( No. 10), pp. 6072–74, ( Nov. 15, 2000).

* cited by examiner

CATALYST-INDUCED GROWTH OF CARBON NANOTUBES ON TIPS OF CANTILEVERS AND NANOWIRES

CROSS-REFERENCE TO RELATED APPLICATIONS

This application is a continuation-in-part of U.S. patent application Ser. No. 09/694,978 filed on Oct. 24, 2000, now U.S. Pat. No. 6,447,663 entitled "Programmable Nanometer-Scale Electrolytic Metal Deposition and Depletion", the entire disclosure of which is incorporated herein by reference.

The United States Government has rights in this invention pursuant to contract no. DE-AC05-00OR22725 between the United States Department of Energy and UT-Battelle, LLC.

FIELD OF THE INVENTION

The present invention relates to carbon nanostructures and methods of growing the same, and more particularly to carbon nanostructures that are attached to catalyst dots, and catalyst-induced methods of growing carbon nanostructures, especially on the tips of cantilevers, nanowires, wafers, conductive micro/nanostructures, and the like.

BACKGROUND OF THE INVENTION
Programmable Nanometer-Scale Electrolytic Metal Deposition and Depletion A previous invention, referenced hereinabove, describes nanometer-scale deposition and/or depletion of nanostructures in liquids at preferably ambient temperature and preferably neutral pH through electric field-directed, programmable, pulsed electrolytic metal deposition or depletion.

Application of a programmable and short (ns—ms time scale) pulsing direct current source is used to control the number of atoms being deposited by the electrolytic metal reduction and deposition process. As shown in the following platinum deposition reaction at a cathode using water-soluble hexachloroplatinate, the number of electrons supplied can control the formation of metallic platinum. In electrolytic deposition, electric current and the duration of the current can control the number of electrons.

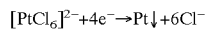

$$[PtCl_6]^{2-} + 4e^- \rightarrow Pt\downarrow + 6Cl^-$$

Other water-soluble metal compounds that have been shown to be applicable include, but are not limited to: $PtCl_4$, $OsCl_3$, $Na_2[PtCl_6]$, $Na_2[OsCl_6]$, $(NH_4)_2RuCl_6$, $K_3RuCl_6$, $Na_2IrCl_6$, $(NH_4)_3IrCl_6$, $(NH_4)_3RhCl_6$, $K_2PdCl_4$, $(NH_4)_2PdCl_4$, $Pd(NH_3)_4Cl_2$, $ReCl_3$, $NiCl_2$, $CoCl_2$, $PtO_2$, $PtCl_2$, $Pt(NH_3)_4Cl_2$, $(NH_4)_6Mo_7O_{24}$, $NaAuCl_4$, $KAu(CN)_2K_2[PtCl_4]$, and $K_3Fe(CN)_6$. Combinations of two or more water-soluble metal compounds can be used sequentially or simultaneously.

As illustrated in FIG. 1, a programmable current source 18 is used to precisely control the number of electrons used to achieve the desired nanometer-scale electrolytic metal deposition. A non-conductive substrate 10 supports nanometer sized electrodes, also called nanowires and nanoelectrodes—cathode 12 and anode 14—which are usually comprised of gold but can be other metals or conductive materials. Spacing between the nanoelectrode tips 13, 15 in the range of 1–10 μm produces results that are suitable for many applications.

A preselected metal 16 is deposited onto the tip of the cathode 12. The metal 16 is usually Pt, but can be any metal that can be deposited electrolytically. A programmable, pulsable current source 18 has electrical connections 20, 22 to the respective nanoelectrodes 12, 14. A bypass circuit 24 is shown, which includes a bypass selector switch 26 and a variable resistor 28.

Nanoelectrodes 12, 14 represent a subset of microscopic sized structures (nanostructures) that are suitable for use. Nanostructures acting as electrodes can be of various sizes and shapes. Spacing between the two nanostructures should not exceed 50 μm, preferably 20 μm, more preferably, 10 μm, most preferably, 5 μm.

The programmable, pulsable current source 18 can be of any suitable construction. Keithley Model 220 programmable current source or the latest Keithley Model 2400 series of Source Meters (available from Keithley Instruments, Inc., 28775 Aurora Road, Cleveland, Ohio 44139, or on the Internet at www.keithley.com) are already capable of supplying a minimum of about 9400 electrons per pulse [500 fA×3 ms×electron/(1.60×10$^{-19}$ C)], which could translate to a deposition of 2350 platinum atoms per pulse based on the stoichiometry of the deposition reaction. If this amount of platinum is deposited on the end of a nanowire with a 10 nm×10 nm cross section, 2350 platinum atoms per pulse can translate into about 1 nm of metal deposition (2.6 layers of platinum atoms) per pulse. The programmable, pulsable current source 18 should be capable of controlling the process so that nanometer metal deposition or depletion as precise as about 1500 metal atoms per pulse can be achieved. A preferable range is contemplated to be 1500×10$^{14}$ atoms per pulse, although the skilled artisan will recognize that the method can operate well beyond this range.

The bypass circuit 24 is preferably added to fine-tune the electron flow for even more precise control of deposition or depletion—the addition or removal of monolayers or sub-monolayers of atoms—that can be achieved. The bypass circuit 24 is used to divert some of the electricity away from the nanoelectrodes 12, 14 in order to deposit or deplete fewer metal atoms per pulse. For example, when the impedance of the variable resistor 28 is adjusted to 50% of the impedance between the two nanoelectrodes 12, 14, two thirds of the 9400 electrons per pulse can be drained through the bypass circuit 24. In this case, the electrolytic metal deposition can be controlled to a step as precise as 780 platinum atoms (3130 electrons) per pulse, which can be translated to a deposition of 0.87 layer of platinum atoms 16 on a 10- by 10-nm surface at the tip of the cathodic nanoelectrode 12. By allowing a greater portion of the current to flow through the bypass circuit 24, it is possible to control deposition of metal 16 atoms as precise as 100 atoms per pulse. A preferable range for this extremely finely controlled deposition is contemplated to be 100–2500 atoms per pulse, although the skilled artisan will recognize that the method can operate well beyond this ultrafine deposition range.

The bypass circuit 24 can also protect the nanometer structure from electrostatic damage, especially when the structure is dry. For example, after desired programmable electrolytic metal deposition is achieved as illustrated in FIG. 1, the bypass circuit 24 should remain connected with the nanostructures 12 and 14 while the programmable pulsing current source can then be removed. As long as the bypass circuit remains connected with the nanostructures 12 and 14, any electrostatic charges that might be created during wash and dry of the nanostructures will be able to flow through the bypass circuit 24 that, in this case, comprises the closed switch 26, the variable resistor 28, and wires that connect the switch 26 and the variable resistor 28 with the nanoelectrodes 12, 14. This prevents accumulation of electrostatic charges at any one of electrodes against the other electrode from occurring, thus eliminating the possibility of electrostatic damage at the nanometer gap between the tips 13, 15 of the nanoelectrodes 12, 14.

A special nanostructural arrangement can be used to control the initiation point(s) of nanometer bonding. Special structural arrangements of the nanowire electrodes can be made by various lithographic techniques (e.g., photolithography and electron-beam lithography) to control the initiation point(s) of the electrolytic metal deposition. As shown in FIG. 2, multiple nanowire cathodes 12, 12' should have respective tips 13, 13' pointing to the respective tips 15, 15' of nanowire anode 14 so that the strongest electric field is therebetween. Spacing of the multiple nanowire cathodes 12, 12' should be regulated to ensure deposition of metal 16, 16' at the desired cathode location, because the electric field (E) is a vector that is strongly dependent on distance (r):

$$E \propto r^{-2}$$

Electrolytic metal-dissolving reactions are applied to deplete metal—open nanometer gaps and control gap size as shown in FIG. 3. By conducting the reversal of the metal deposition reaction with sodium chloride solution instead of hexachloroplatinate as an electrolytic substrate, metallic platinum at the anode tip(s) 16 can be electrolytically depleted via dissolution in a controllable way according to the following reaction:

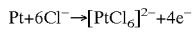

$$Pt + 6Cl^- \rightarrow [PtCl_6]^{2-} + 4e^-$$

This metal-dissolution reaction should also be able to control the gap size between the nanoelectrode tips 13, 15. The site and the extent of electrolytic metal depletion can also be controlled by proper selection of the desired polarity of the electric field and by use of a programmable current source with a bypass circuit, as described herein.

The salient features of the method described hereinabove may be applied in full, in part, or in any combination. Any number of nanostructures can be simultaneously bonded or dissolved on a particular substrate.

For metal deposition, the nanostructure to be metal-deposited does not have to be metal. The method can be used to connect any conductive nanowires such as, for example, nanotubes, especially carbon nanotubes, because of their capability for nanometer electrolytic metal deposition.

For metal depletion, the nonmetallic ions do not have to be $Cl^-$. Any anions, such as $F^-$ and $CN^-$, that can electrolytically dissolve metals (Pt, Pd, Au, etc.) may be used as alternative versions of the method.

Carbon Nanotubes/Fibers and Catalyst-induced Growth on 2-D Surfaces

Patterned growth of individual and mutiple vertical aligned carbon nanotubes and fibers has been experimentally demonstrated on a nanocatalyst-doped two-dimensional surface. See Merkulov, V. I., D. H. Lowndes, Y. Y. Wei, G. Eres, and E. Voelkl (2000) "Patterned growth of individual and multiple vertically-aligned carbon nanotubes," *Appl. Phys. Lett.* 76, 3555.

Carbon nanotubes possess a number of unique properties, some of which make carbon nanotubes ideally suited for use as probe tips in scanning probe microscopy (SPM). Firstly, single-wall carbon nanotubes have intrinsically small diameters (~1.4 nm), which allow significant improvement of lateral resolution compared to conventional Si, SiN or other tips, which typically have diameters of at least 10–20 nm. Secondly, carbon nanotubes have very high aspect ratios, AR (AR=length/diameter), which provides the ability to measure deep and near-vertical features, especially those having a sidewall slope that cannot be reproduced accurately using conventional tips. Thirdly, carbon nanotubes exhibit high mechanical strength and flexibility and therefore will not break easily upon crashing into a sample surface, which is a fairly common accident in SPM. Fourthly, some carbon nanotubes are electrically conducting, which permits their use for high-resolution scanning tunneling microscopy (STM). Finally, carbon nanotubes can be chemically selectively modified by attaching organic (or other) molecules at their ends, which creates the possibility of using them as functional probes to detect a particular property or molecule of interest.

Multi-wall carbon nanotubes are somewhat larger in diameter than single-wall carbon nanotubes but they share many of the same properties, to varying degrees. Single-wall carbon nanotubes and multi-wall carbon nanotubes differ primarily in their diameter and morphology. A single-wall carbon nanotube can be thought of as a one-atom-thick sheet of carbon atoms, arranged in the hexagonal graphitic crystal structure, that is rolled up and its edges joined seamlessly (edge atoms overlapping) to form a cylinder. A multi-wall carbon nanotube consists of two or more such concentric cylinders.

Closely related to carbon nanotubes are carbon nanofibers. Carbon nanofibers differ from single-wall carbon nanotubes and multi-wall carbon nanotubes mainly in their crystalline perfection, i.e. the graphite lattice contains many structural defects so that different layers (of a multi-walled fiber) can be either interrupted or joined to one another (or both types of defect can occur at different locations along the length or around the periphery of the fiber). One consequence of these defects is that the electrical properties of carbon nanofibers are not as good as for carbon nanotubes. Carbon nanofibers are synthesized at somewhat lower temperatures than carbon nanotubes and their lower growth temperature is responsible in part for these defects. However, we have recently demonstrated that carbon nanofibers also can be grown with sufficiently small diameter to be of interest for scanning probes. Furthermore, there may be future situations for which a low growth temperature is desirable, e.g. sufficiently low-temperature growth will be compatible with on-board electronic circuitry.

The advantages of carbon nanotubes as scanning probes have been demonstrated by placing carbon nanotubes at the end of a conventional Si tip. The carbon nanotubes were either attached to the tip by electrical and mechanical means in an optical or scanning electron microscope or were grown directly on a tip using conventional high-temperature chemical vapor deposition (CVD) along with catalytic pore formation. However, these procedures have a number of disadvantages: (a) the carbon nanotubes first must be grown at high temperatures and separated, cleaned and cut to length; (b) in most cases it is difficult to adjust the length of the nanotube tip and to obtain a strong, reliable attachment; and (c) these complicated manipulations of carbon nanotubes are impractical in an industrial environment or for large-scale production. See the following: Dai, H., J. H. Hafner, A. G. Rinzler, D. T. Colbert, and R. E. Smalley, Nature 384, 147 (1996); Nishijima, H., S. Kamo, Seiji Akita, Y. Nakayama, K. I. Hohmura, S. H. Yoshimura, and K. Takeyasu, (1999) Appl. Phys. Lett. 74, 4061; and Hafner, J. H., C. Li Cheung, and C. M. Lieber (1999) Nature 398, 761.

OBJECTS OF THE INVENTION

Accordingly, objects of the present invention include: provision of methods of fabricating carbon nanostructures, especially for use as scanning probe tips; methods of growing perpendicularly oriented carbon nanostructures directly on the tips of scanning probe cantilevers, nanowires, conductive micro/nanostructures, wafer substrates and the like, particularly with precise control of crucial tip parameters (shape, position and length) and mechanically very strong connections to the substrates. Further and other objects of the present invention will become apparent from the description contained herein.

SUMMARY OF THE INVENTION

In accordance with one aspect of the present invention, the foregoing and other objects are achieved by a method growing a carbon nanostructure, which includes the steps of:

a. providing a substrate;

b. depositing a catalyst dot onto the substrate; and c. growing a carbon nanostructure on the catalyst dot.

In accordance with another aspect of the present invention, an article comprising a substrate having an adherent metal dot disposed thereon, the metal dot having a carbon nanostructure disposed thereon.

For a better understanding of the present invention, together with other and further objects, advantages and capabilities thereof, reference is made to the following disclosure and appended claims in connection with the above-described drawings.

DETAILED DESCRIPTION OF THE INVENTION

Figure 1:
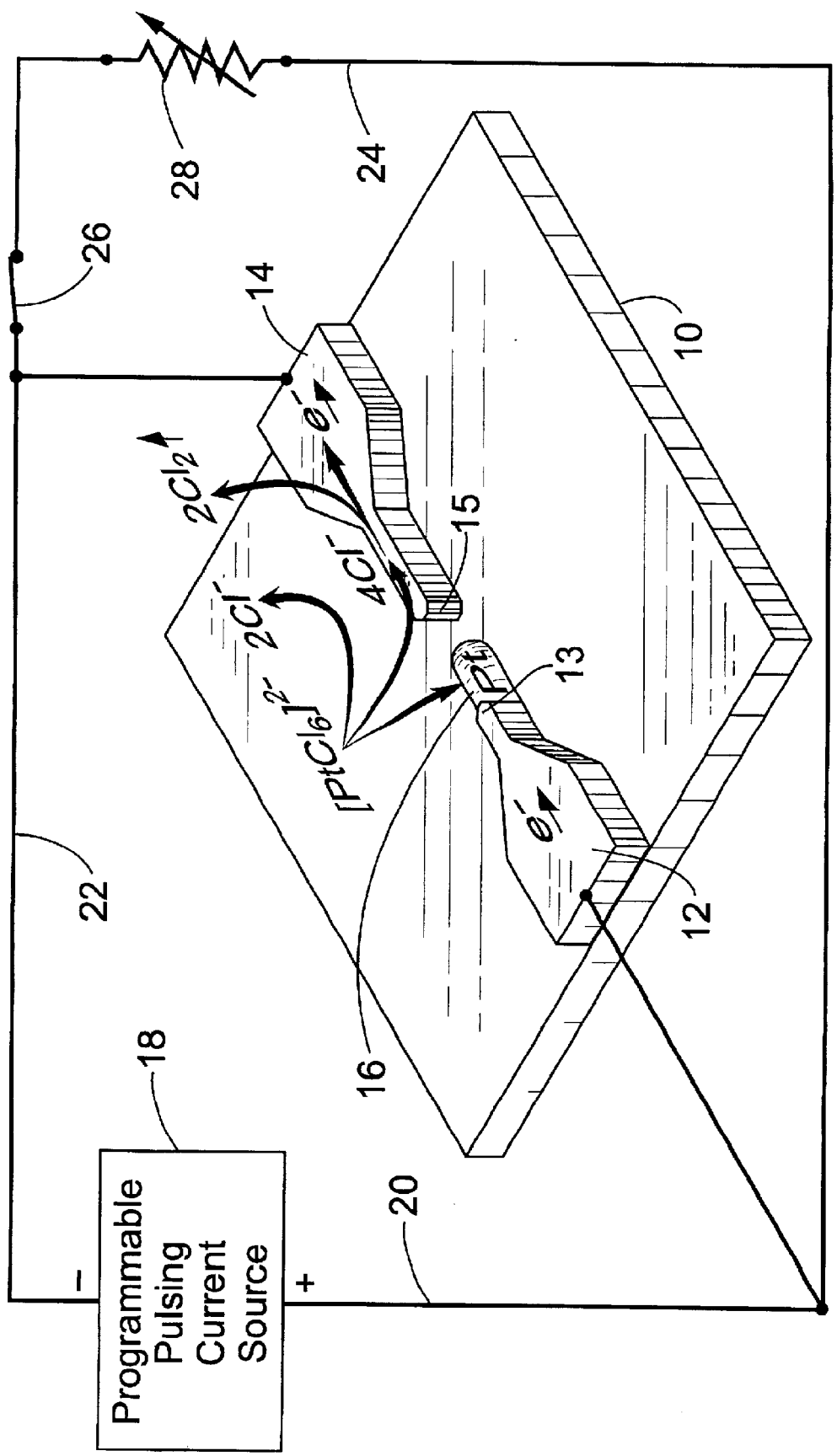
FIG. 1 is an illustration of deposition of platinum (Pt) on a gold nanostructure.
Figure 2:
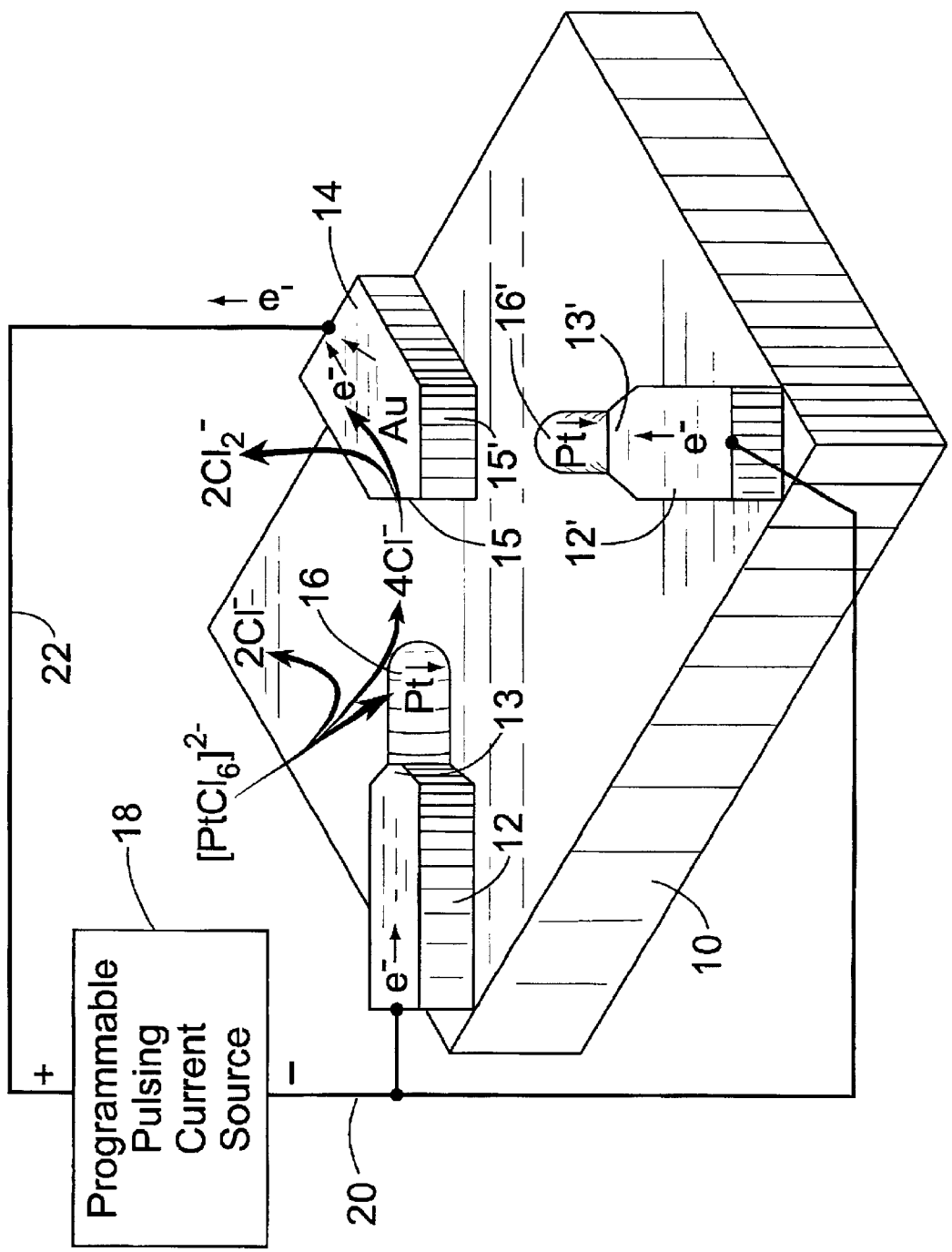
FIG. 2 is an illustration of deposition of platinum (Pt) on multiple gold nanostructures.
Figure 3:
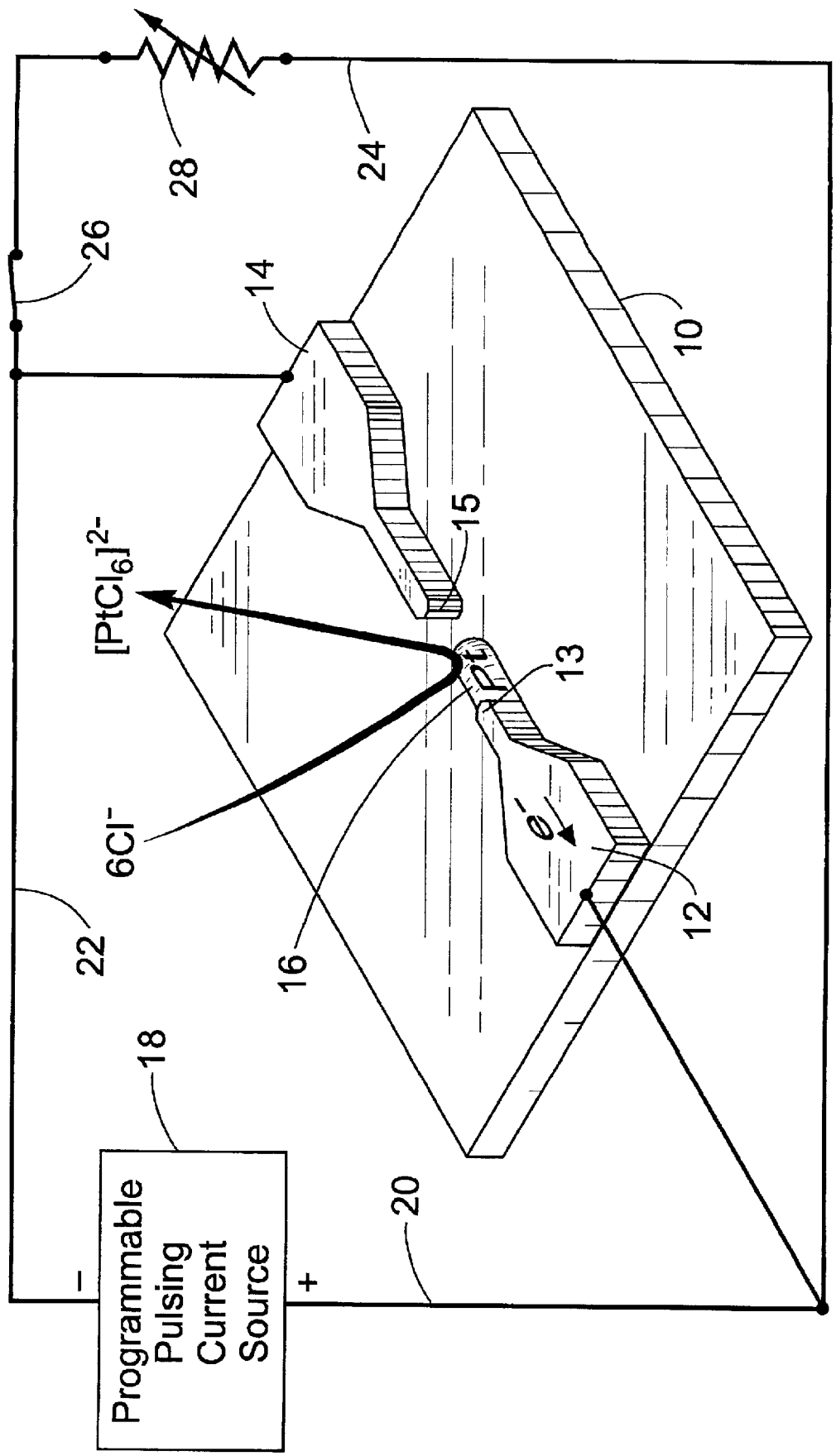
FIG. 3 is an illustration of depletion of platinum (Pt) from a gold nanostructure.
Figure 4:
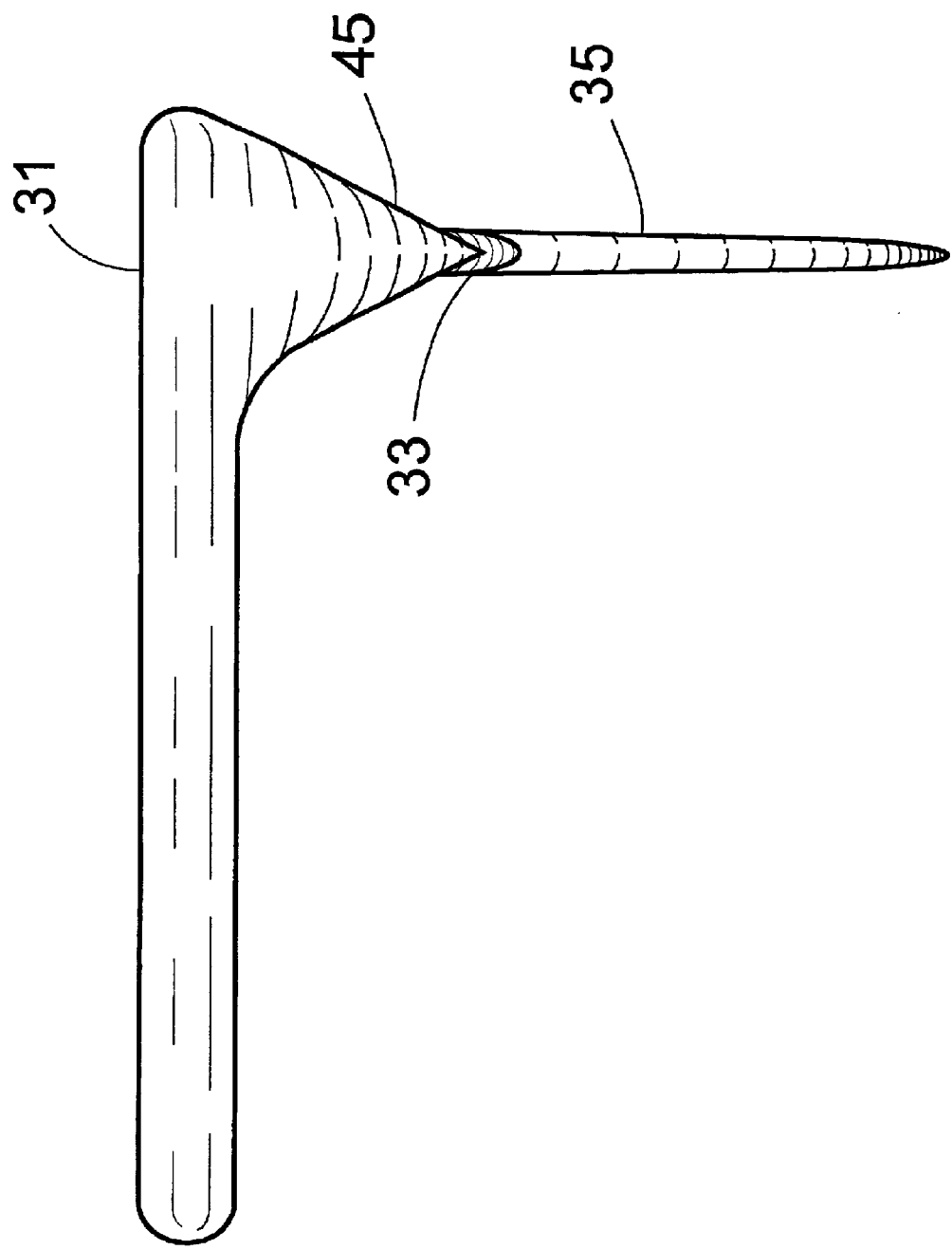
FIG. 4 is an illustration of a carbon nanostructure attached to a catalyst-tipped cantilever in accordance with an embodiment of the present invention.

The above-described previous invention can be used in one of the key steps of the present invention, to deposit metallocatalysts for carbon nanostructure growth at the tips of nanowires and/or conductive cantilevers. FIG. 4 shows a basic conductive substrate 31 having deposited thereon a tip 45 thereof a small amount (dot) 33 of catalyst and a carbon nanostructure 35 extending therefrom. The substrate 31 can be a nanowire, a cantilever, a micro/nanometer structure, a wafer, or any other suitable structure made of any material. The catalyst "dot" 33 is the necessary material for inducing the catalytic growth of a single carbon nanostructure at a predetermined location. The catalyst dot 33 can be monometallic, metallic, nonmetallic, or any material that produces desired carbon nanostructure growth.

The present invention applies generally to carbon nanotubes (including both single-wall carbon nanotubes and multi-wall carbon nanotubes) and also to carbon nanofibers, needles, whiskers, and the like. Therefore, all nanoscale carbon structures are henceforth referred to using the inclusive general term "carbon nanostructures".

The present invention can be used for production of carbon nanostructure-anchored cantilevers that can significantly improve the performance (such as resolution) of conventional scanning probe microscopy, for example, atomic force microscopy (AFM), scanning tunneling microscopy (STM), etc. The present invention can be used also in many other processes of micro and/or nanofabrication with carbon nanostructures.

Some features of the present invention are:

1. Proper selection of metal catalyst(s), for example, Co, Ni, and Fe, and preferably programmable, pulsed electrolytic deposition of the desired specific catalysts precisely at the tips of nanowires and/or conductive cantilevers;

2. Catalyst-induced growth of carbon nanostructures at the catalyst-deposited tips;

3. Control of carbon nanostructure growth pattern by manipulation of tip shape and growth conditions; and 4. Automation for mass production.

These and other features of the present invention are described as follows.

Deposition of Catalyst Dot

Figure 5:
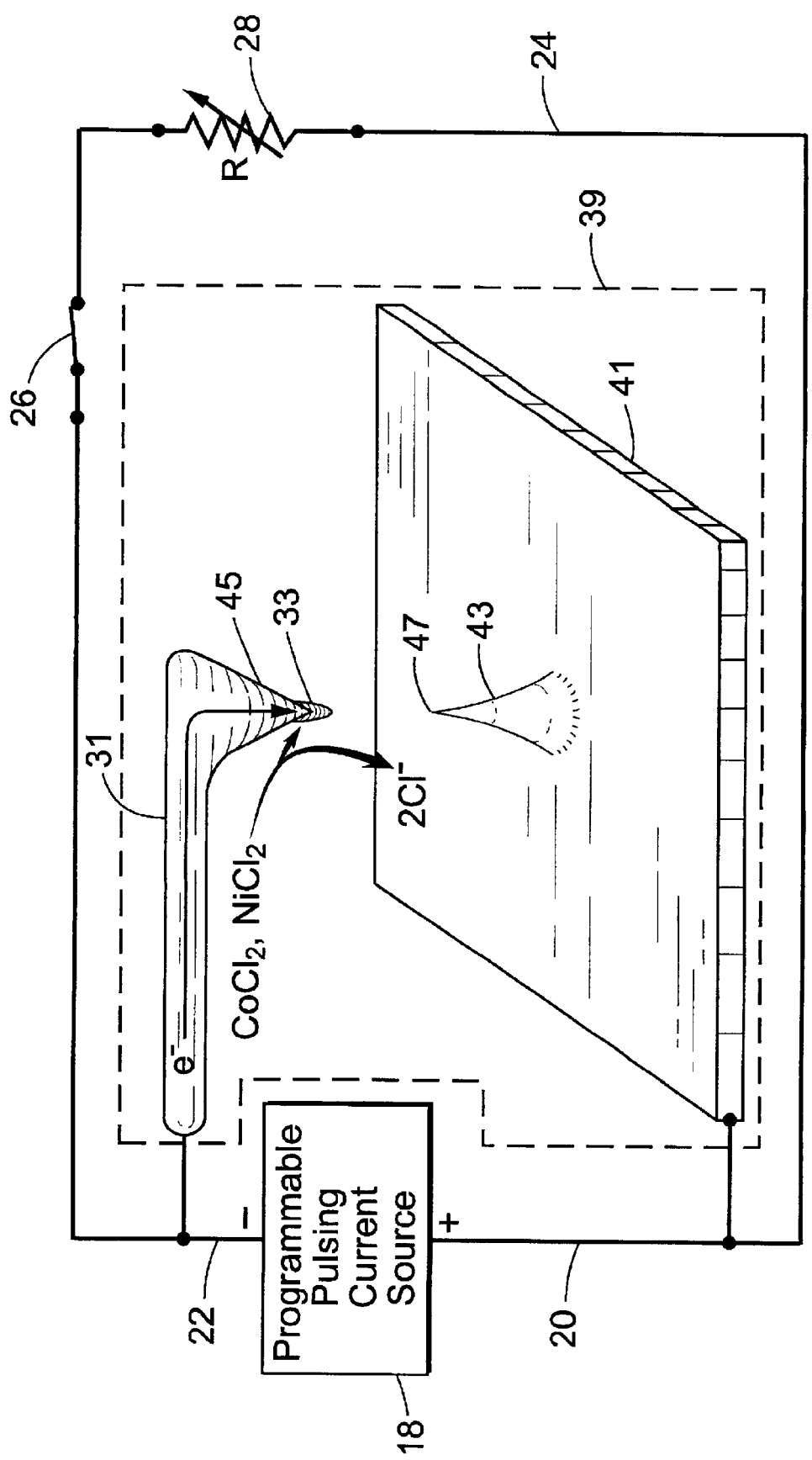
FIG. 5 is an illustration of programmable precision electrolytic deposition of a nanocatalyst (catalyst dot) onto the tip of a conductive cantilever in accordance with an embodiment of the present invention.

Deposition of the catalyst dot 33 is preferably achieved by application of the above-described earlier invention in conjunction with the use of a liquid AFM system. As illustrated in FIG. 5, a solution of at least one metal catalyst compound, for example, $NiCl_2$, $CoCl_2$, $Fe^{2+}$, etc., that are suitable for electrolytic deposition of the desired catalyst is added into a liquid AFM cell 39. With the liquid AFM system, the tip 45 of a conductive AFM cantilever 31 can be aligned with the tip 47 of a nanowire or another cantilever 43 pointing up. The cathodic tip 45 to anodic tip 47 spacing can easily be controlled. Spacing of the tips 45, 47 should be regulated to ensure deposition of a metal catalyst dot 33 at the desired cathode location, because the electric field (E) is a vector that is strongly dependent on distance (r):

$$E \propto r^{-2}$$

Spacing between the nanoelectrode tips 45, 47 in the range of 1–10 $\mu$m produces suitable results using the present invention. The electrolytic deposition of metal catalyst 33 is achieved by applying short (ns-ms) pulses of precisely controlled fine electric current across the two tips 45, 47 using a programmable current source 18 and a bypass circuit 24 as described hereinabove. A preferable range for an extremely finely controlled deposition is contemplated to be 100–2500 atoms per pulse, although the skilled artisan will recognize that the present invention can operate well beyond this ultrafine deposition range. Since the deposition can be as fine as 100 atoms per pulse, extremely fine and desired deposition of nanometer metallocatalysts could be achieved precisely at the cathodic tip 45 as exemplified in the following nickel deposition reaction.

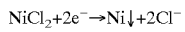

$$NiCl_2 + 2e^- \rightarrow Ni\downarrow + 2Cl^-$$

Buffer Layer

A buffer layer is generally a thin-film material deposited on some substrates for at least one of several purposes, including:

1. Preventing deleterious reactions between the catalyst and substrate materials, to such an extent that they are unable to properly catalyze the growth of carbon nanostructures. For example, a buffer layer of Ti may be deposited on a Si substrate prior to deposition of a Ni catalyst dot in order to prevent the formation of $Ni_2Si$ at elevated temperatures necessary for carbon nanostructure growth.

2. Enhance adhesion of the catalyst dot to the substrate. For example, a buffer layer of Ti may be deposited on a Si substrate prior to deposition of a Ni catalyst dot in order to strongly enhance adhesion of the Ni to the substrate.

Figure 7:
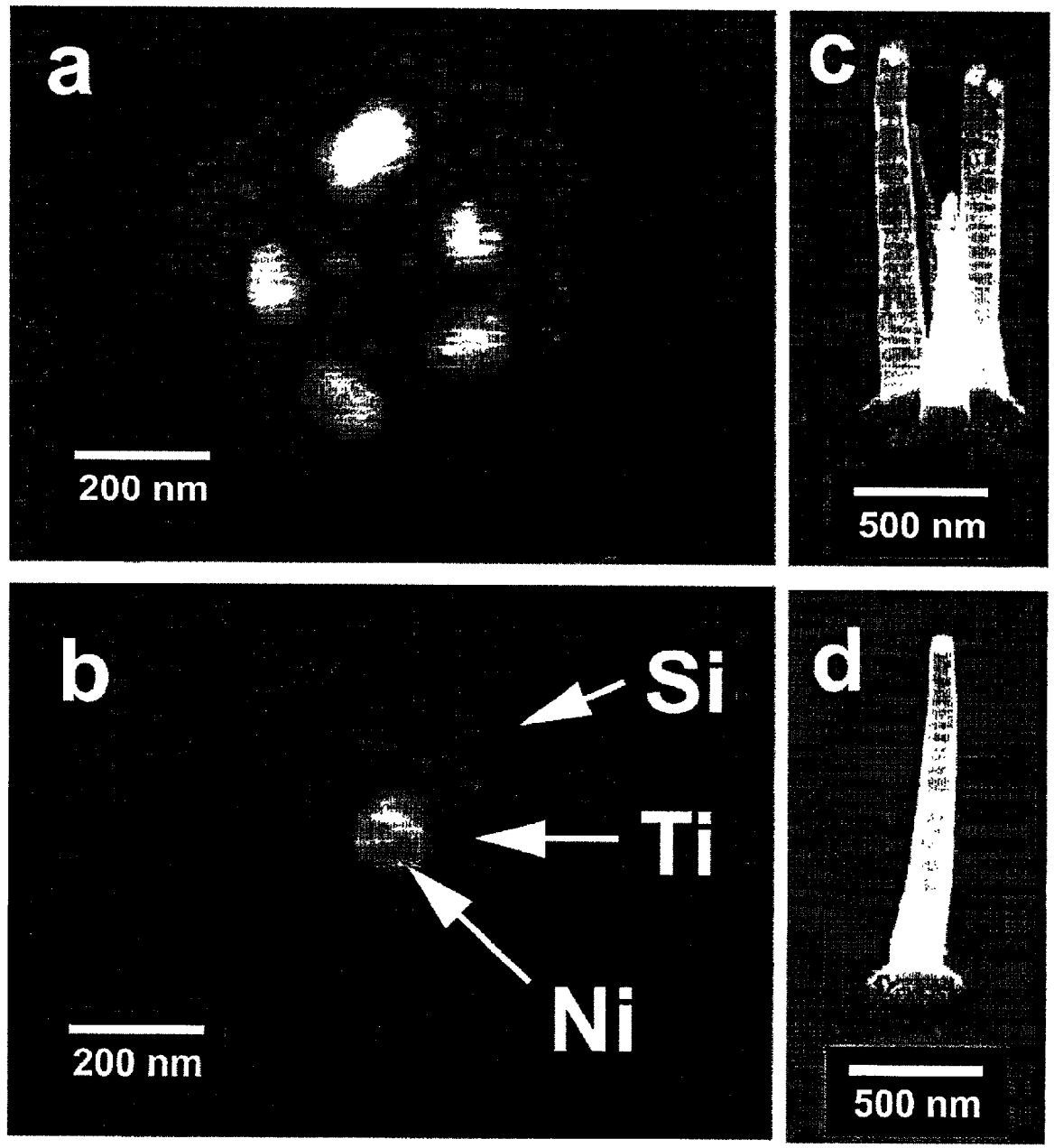
FIGS. 7a–7d are SEM micrographs of experimental demonstrations of deposition of catalyst dots and growth thereon of carbon nanostructures in accordance with an embodiment of the present invention.

As such, the buffer-layer material should also be relatively non-reactive with the catalyst dot, and should adhere reasonably well to the substrate. The buffer-layer film can be deposited by any method suitable for the particular materials being used, including, for example, electron-beam evaporation, thermal evaporation, ion beam sputtering, and electrodeposition, but not restricted to these. Examples of suitable buffer layers for a silicon substrate and a nickel catalyst dot include tungsten, molybdenum, or titanium films, or a tungsten-titanium alloy film, where the latter illustrates the use of titanium to produce strong adhesion of the buffer layer to the silicon substrate, but relative inertness of the buffer layer components to the catalyst dots. For example, the micrographs of FIGS. 7a, 7b show Ni catalyst dots deposited on Ti buffer layers on a Si substrate.

Growth of Carbon Nanostructures on Catalyst Dot

Figure 6A:
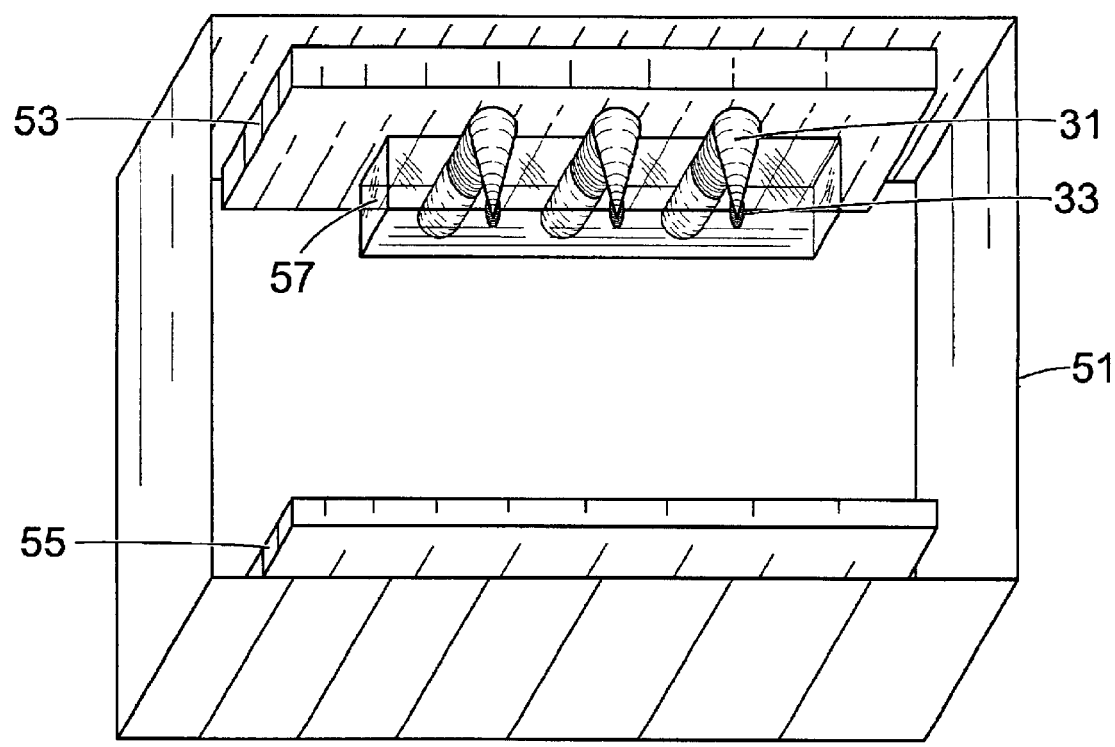
FIG. 6a is an illustration of catalyst dots on tips of cantilevers in a reaction chamber in accordance with an embodiment of the present invention.

Referring now to FIG. 6a, the substrates 31 with catalyst dots 33 are then placed into a reaction chamber 51 for catalyst-induced growth of carbon nanostructures 35 on the catalyst dots 33. The reaction chamber 51 includes a combination cathode and heater plate 53, and an anode plate 55. A rack 57 mounted on the combination cathode and heater plate 53 supports preferably multiple substrates 31. The rack 57 may be conductive, or it may be non-conductive with a separate electrical connection between the combination cathode and heater plate 53 and the substrates 31 (not illustrated). The substrates 31 are shown with the dots 33 facing in a downward direction in order to facilitate the growth of nanostructures 35 in a desired orientation (downward).

Figure 6B:
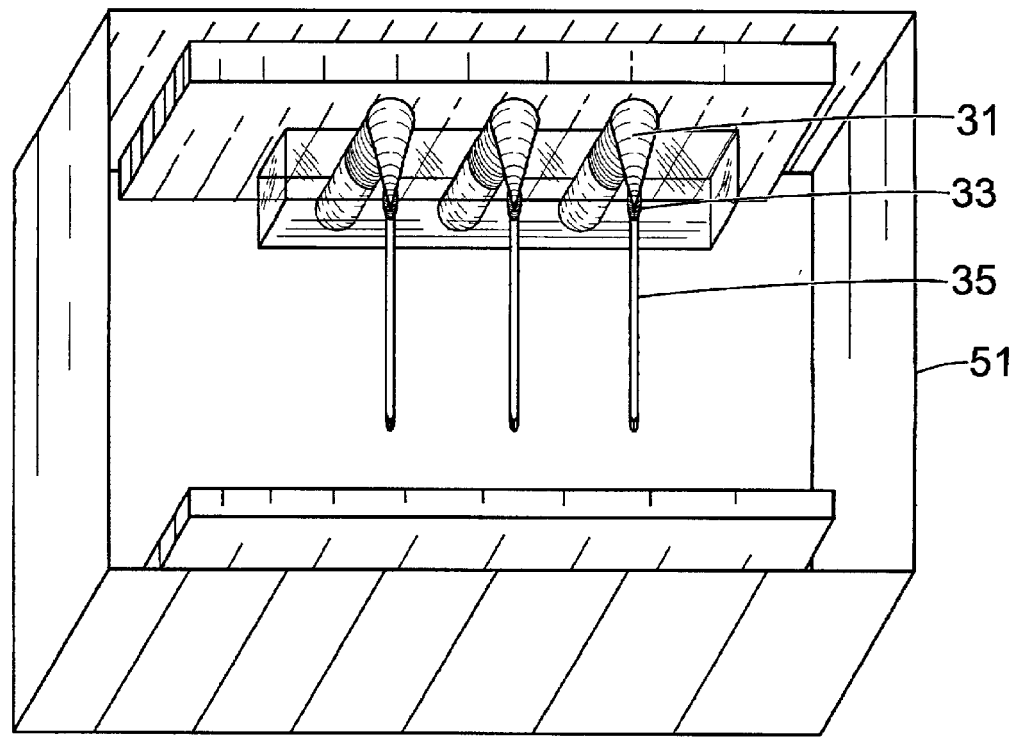
FIG. 6b is an illustration of catalyst-induced growth of vertically aligned carbon nanostructures on the catalyst dots in accordance with an embodiment of the present invention.

Referring now to FIG. 6b, since the growth of carbon nanostructures 35 generally requires a specific catalyst, the growth of a carbon nanostructure 35 can be made to occur only at the catalyst dots 33 located on the tips of the substrates 31, resulting in a desired configuration as shown. The growth of carbon nanostructures can be achieved through (but not limited to) plasma-enhanced chemical vapor deposition (PE-CVD) using a mixture of a carbonaceous gas and an etchant (fro example, acetylene and an ammoniahelium mixture).

EXAMPLE I

As illustrated in FIGS. 7a–d, carbon nanostructures were grown on catalyst dots by plasma-enhanced chemical vapor deposition (PE-CVD) in a vacuum chamber as described hereinabove. Upon annealing the Ni/Ti dot on the Si substrate at the elevated temperatures required for growing carbon nanostructures ($\geq 600°$ C.), the Ti layer continued to adhere to Si. At or larger than a critical dot size, however, the initially continuous, disc-shaped Ni catalyst dot balled up and separated into several smaller, approximately hemispherical-shaped "sub-dots", shown as light spots in FIG. 7a. Each sub-dot subsequently provided a discrete substrate location for a separate carbon nanostructure to grow. FIG. 7c shows several carbon nanostructures extending from the multiple sub-dots. This configuration may be desirable for some applications, and not so for other applications.

Below the critical dot size only a single Ni dot was formed, as shown in FIG. 7b, resulting in a single nanostructure, as shown in FIG. 7d. The critical dot size, and the size of its resulting Ni droplet, depended primarily upon the choice of the buffer layer between the catalyst and the substrate, the type and thickness of the catalyst metal used, and the carbon nanostructure annealing/growth temperature.

For growth of a single carbon nanostructure at 700C. using an initially 15 nm thick Ni catalyst film on a Ti buffer layer on Si, the critical dot size (diameter) is usually about 350 nm. The diameter of the finished Ni dot is about a factor of 3 smaller than the initially formed Ni dot, i.e. ~100 nm in the above example. The change in diameter occurs mainly because the Ni dot "balls up" and becomes generally hemispherical in shape during the plasma heating process, in place of its initial flat, disk-like shape. The skilled artisan will recognize that little or no Ni is lost from the dot during this process. If it were, then it might be uncontrollably re-deposited elsewhere, resulting in carbon nanostructure growth at other than the desired locations.

Smaller catalyst dots can be obtained. This is significant because the carbon nanostructure diameter, which should be as small as possible for high-resolution scanning probe microscopy (SPM), is generally governed by the size (diameter) of the catalyst dot. By making initial catalyst dots having diameters no larger than 30 nm—easily possible with electron beam lithography (EBL)—it is possible to grow carbon nanostructures having diameters of less than 10 nm, including single-wall carbon nanotubes having diameters as small as about 1.4 nm. Since the programmable-electrolytic-pulsed deposition technique can perform deposition as fine as about 100 atoms per pulse, an extremely fine (nanometer) catalyst dot can be deposited onto a substrate. Use of such a fine nanometer dot of catalyst should be able to grow carbon nanostructures having diameters of less than 10 nm, including single-wall carbon nanotubes having diameters as small as about 1.4 nm. However, higher growth temperature (900–1000° C.) will probably be required for the growth of these extremely fine carbon nanotubes.

For carbon nanostructure growth, a mixture of a carbonaceous gas and an etchant (for example, acetylene and an ammonia-helium mixture) is used as the gas source in the reaction chamber 51. The etchant (basically a source of atomic hydrogen) is needed to etch away graphitic carbon film that continuously forms during the carbon nanostructure growth from the plasma discharge. The additional unwanted carbon would otherwise passivate the catalyst metal and thereby prevent the formation of carbon nanostructures if it were not removed.

In contrast to using a conventional heating technique wherein substrate is indirectly heated by using hot filament PE-CVD, in the method of the present invention the substrates 31 are heated directly by placing them on a heater plate 53, which also can serve as the cathode of the plasma discharge. This technique has the advantages that it can easily be scaled up for large-area deposition and the substrate temperature is easily controlled. For example, an array of cantilevers 31 can be patterned with dots 33 as described hereinabove and then placed on the heater plate 53 to simultaneously grow all of the highly uniform carbon nanostructures 35 as shown in FIG. 6b. The length of the carbon nanostructures 35 can be controlled by controlling the duration of the PE-CVD process.

Just prior to carbon nanostructure growth, ammonia is introduced into the chamber 51 and plasma is created. Any plasma forming energy can be used, for example, dc glow discharge, radio-frequency (rf), and microwave. After the plasma is started, acetylene is introduced and growth of carbon nanostructure 35 begins. However, other carbonaceous and etchant gases could be used, e.g. methane, nitrogen, and hydrogen gases. Each catalyst dot 33 initiates the formation of a single carbon nanostructure as shown in FIGS. 7a–d. The catalyst dot 33 resides on top of the carbon nanostructure as the carbon nanostructure grows and provides for its continued catalytic growth. The carbon nanostructures normally are oriented perpendicular to the substrate. The mechanism for their vertical alignment is not fully understood; one possibility is that they align along the direction of the plasma discharge (electric field direction). However, by changing the direction of the discharge at the substrate (e.g. by tilting the substrate or tilting/moving the anode) carbon nanostructures can be grown at other angles to the substrate.

EXAMPLE II

Arrays of single carbon nanostructures were successfully grown directly on commercial SiN contact-mode AFM cantilevers utilizing the two-step process described above.

Carbon Nanostructure Growth on Flattened Tips

Figure 8A:
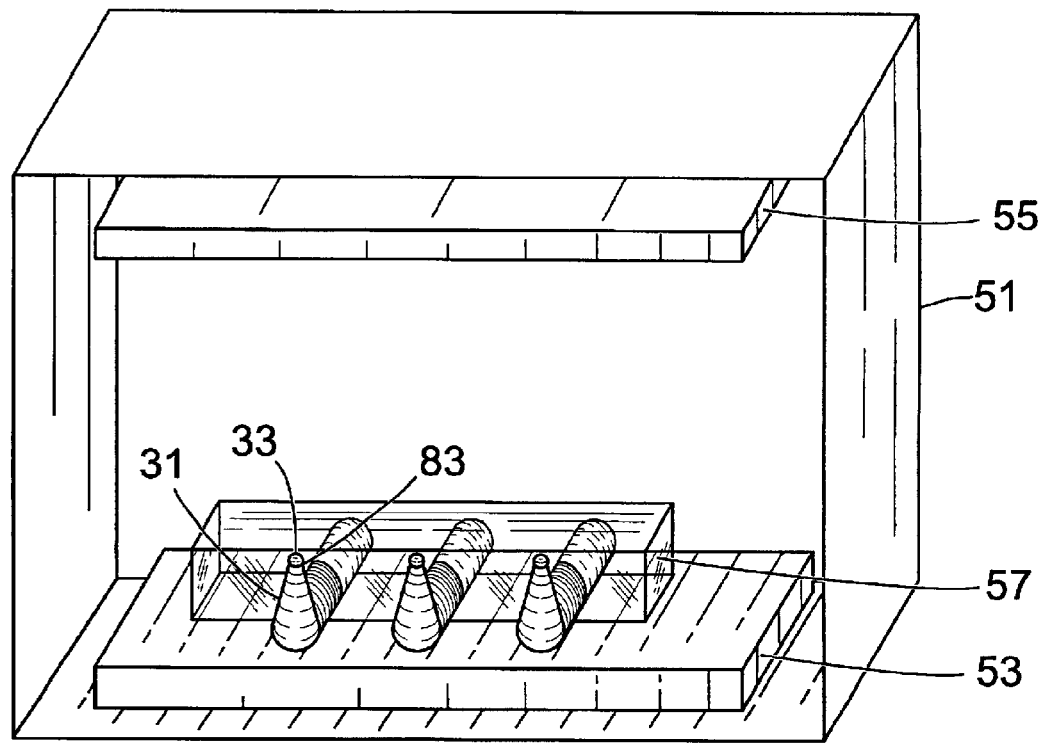
FIG. 8a illustrates an array of slightly flattened and catalyst-deposited tips of cantilevers and/or nanowires oriented upwardly against the direction of the gravity in a carbon-nanostructure-growth chamber in accordance with an embodiment of the present invention.
Figure 8B:
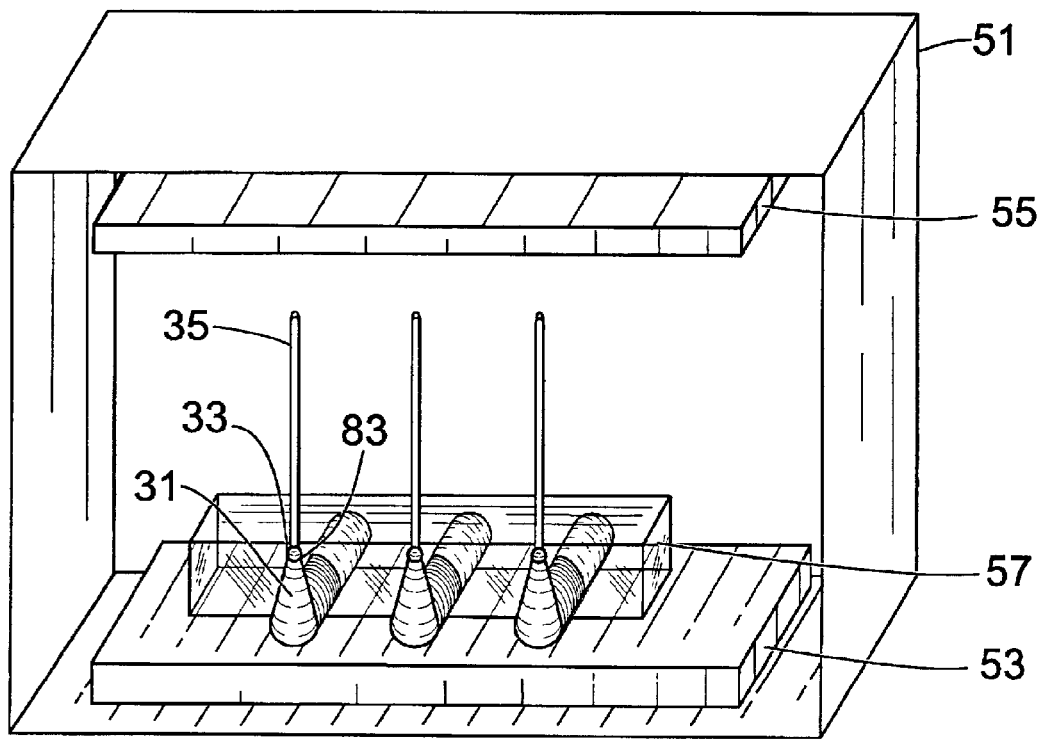
FIG. 8b is an illustration of catalyst-induced, upward growth of vertically aligned carbon nanostructures on the catalyst dots in accordance with an embodiment of the present invention.

As described above, the catalyst dot 33 can be deposited onto very sharp tip 45, which is preferably pointing directly downward, as shown in FIG. 4, to achieve downward carbon nanostructure growth. Upward carbon nanostructure growth is best achieved with a slightly different technique, using a flat tip 83, as shown in FIGS. 8a, 8b. If a sharp tip 45 is inverted (with the tip pointing upwardly) during the heating process for nanostructure growth, the catalyst dot 33 may have a tendency slide down the side of the cantilever 31, resulting in carbon nanostructure growth in a lateral direction. Even slight displacement of the dot 33 can produce undesirable results. As shown in FIGS. 8a, 8b, a catalyst dot 33 on a flat tip 83 is unlikely to slide down the side of an inverted cantilever 31. It is contemplated that a flat tip 83 may be a particularly suitable structure for an automated system to locate before depositing the catalyst dot 33.

Further information about catalyst-assisted growth of vertically aligned carbon nanotubes/fibers can be found in the following publication:

Merkulov, V. I., D. H. Lowndes, Y. Y. Wei, G. Eres, and E. Voelkl (2000) "Patterned growth of individual and multiple vertically-aligned carbon nanotubes," *Appl Phys. Lett.* 76, 3555.

Automation for Mass Production.

All of the methods described hereinabove can be automated for high-volume mass production of carbon nanostructures for scanning probe microscopy and other needs. For example, the deposition of a catalyst dot 33 (generally with a size range from a few hundred to several thousand catalyst atoms) on a tip 45, 83 by the programmable precision deposition technique described hereinabove can be completed within a few microseconds.

Figure 9:
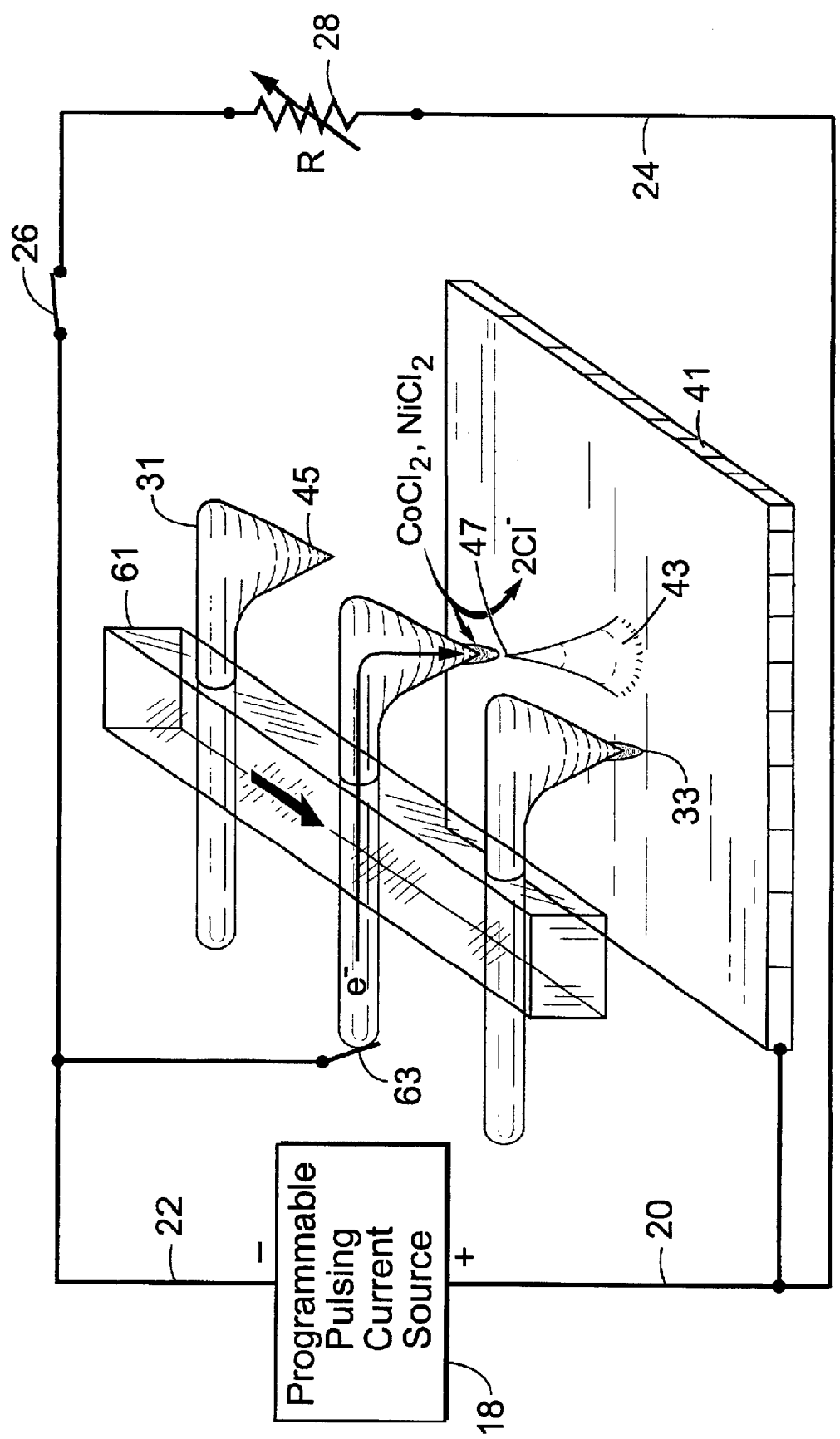
FIG. 9 is an illustration of an automation system for programmable electrolytic deposition of catalyst dots onto the tips of conductive cantilevers in accordance with an embodiment of the present invention.

FIG. 9 shows a system similar to those illustrated earlier, but with added features for automation. A non-conductive rack 61 successively moves substrates 31 into position (in the direction of the arrow) where a contact 63 energizes the substrate 31 to deposit a catalyst dot 33 thereon. By use of an automated process such as illustrated in FIG. 9, it is possible to move a large array of substrates 31 in and out of the deposition chamber within a second. It is contemplated that use of an automated programmable electrolytic deposition process should be able to place catalyst dots 33 on substrate tips 45, 83 at a rate of more than 3000 tips per hour.

Following mass production of catalyst dots 33 on substrate tips 45, 83, and within a much larger batch reaction chamber than the reaction chamber 51 shown in FIGS. 6a, 6b, 8a, 8b, the catalyst-assisted growth of carbon nanostructures on thousands of catalyst-deposited tips can be completed within about 15 minutes per batch. Therefore, the present invention is highly suitable for mass production and commercial use.

The present invention can be used for production of carbon-nanostructure cantilevers that can significantly improve the performance (such as resolution) of the current technology in the art of scanning probe microscopy (AFM, EFM etc).

Figure 10:
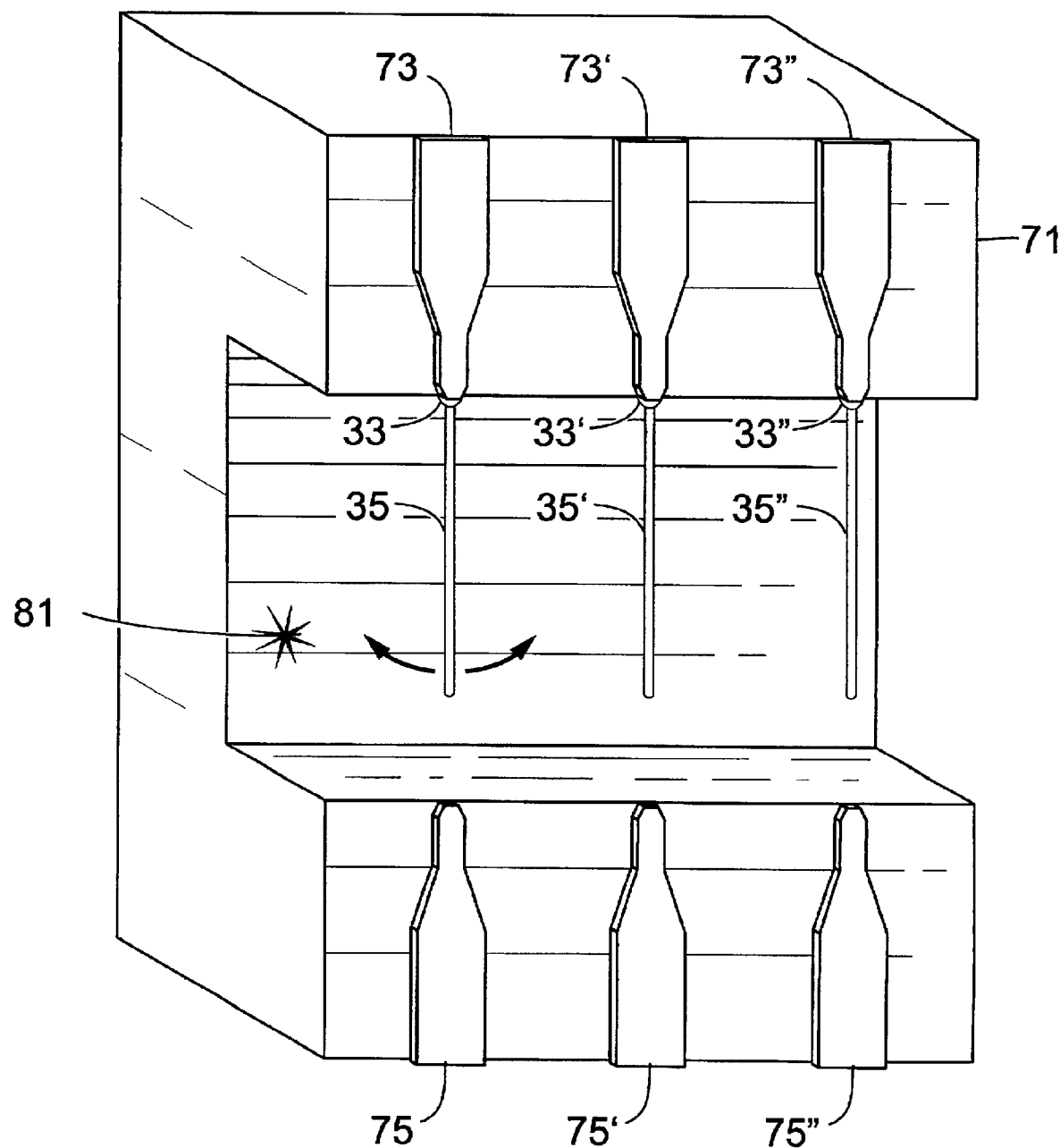
FIG. 10 is an illustration of carbon nanostructure-based micrometer/nanometer electro-mechanical sensors and devices in accordance with an embodiment of the present invention.

The present invention is also valuable to the micrometer- and/or nanometer-fabrication of any devices that require controlled placement of carbon nanostructures on conductive tips of micro and/or nanometer structures in general. For example, use of the present invention can create carbon nanostructures that can be used for development of micro/nanometer sensors and/or electromechanical devices. FIG. 10 is an example wherein opposing pairs of nanoelectrodes (73, 73', 73" and respective 75, 75', 75") are pre-fabricated on a nonconductive (e.g., silicon oxide) substrate 71 by, for example, e-beam lithographic techniques. Catalyst dots 33, 33', 33" are then deposited onto the tips of nanoelectrodes 73, 73', 73" as described hereinabove. The substrate 71 is then placed into the PE-CVD reaction chamber wherein carbon nanostructures 35, 35', 35" are grown on the respective dots 33, 33', 33".

It has been demonstrated that static and dynamic mechanical deflections (shown by arrows in FIG. 10) can be electrically induced in anchored carbon nanostructures and that the use of the harmonic vibration resonances of carbon nanostructures can weigh individual particles in the femtogram-to-picogram size range.

It is possible to use carbon-nanostructure-based devices such as that shown in FIG. 10 to detect molecular explosion, chemical reaction, or other microscale or nanoscale event 81, which can have important applications, for example, security applications at airports and other facilities.

Moreover, carbon nanostructure-based devices can be used to detect other analytes, for example, aerosols, chemical and biological warfare components, and the like.

The above examples illustrate the controllable use of carbon nanostructures made in accordance with the present invention to create a new class of micro/nanometer sensors and devices.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A method of growing a carbon nanostructure comprising the steps of:
   a. providing a substrate having thereon at least two electrically conductive nanostructures spaced no more than about 50 μm apart; and
   b. depositing a catalyst dot on at least one of said nanostructures by electric field-directed, programmable, pulsed electrolytic metal deposition; and
   c. growing a carbon nanostructure on said catalyst dot.

2. A method in accordance with claim 1 wherein said substrate comprises at least one of the group consisting of a nanowire, a cantilever, a conductive micro/nanometer structure, and a wafer.

3. A method in accordance with claim 1 wherein said growing step further comprises a plasma-enhanced chemical vapor deposition method.

4. A method in accordance with claim 1 wherein said carbon nanostructure is grown in a direction perpendicular to a surface of said substrate.

5. A method in accordance with claim 1 wherein said carbon nanostructure is grown on a flat-tipped surface having an upward-facing catalyst dot.

6. A method in accordance with claim 1 wherein said carbon nanostructure further comprises as least one of the group consisting of a single-wall carbon nanotube, a multi-wail carbon nanotube, a carbon nanofiber, a carbon needle, and a carbon whisker.

7. A method in accordance with claim 1 wherein said depositing step further comprises an automated process.

8. A method in accordance with claim 1 wherein said growing step further comprises an automated process.

* * * * *